UNITED STATES PATENT OFFICE.

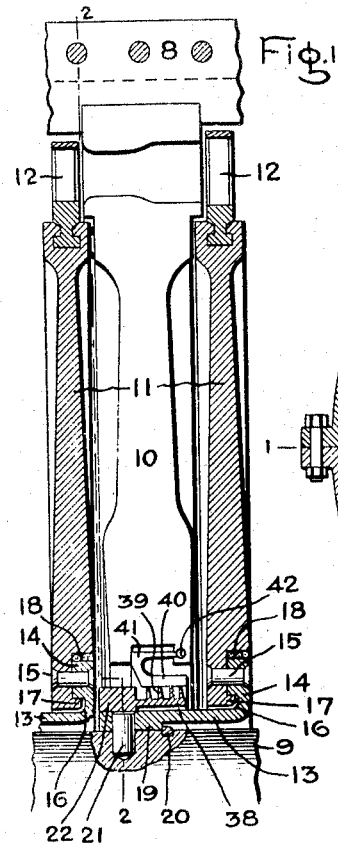

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,326,870.

Specification of Letters Patent.   Patented Dec. 30, 1919.

Application filed May 9, 1919. Serial No. 295,856.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic fluid turbines and particularly to turbines of the type comprising a plurality of disks or wheels mounted on a shaft and carrying suitable buckets upon the periphery. With such turbines it is important that the disks or wheels be made as light as possible in order to reduce the weight of the machine thereby reducing its size. In addition, by making the disks or wheels as thin as possible particularly at the hubs where the greatest stresses occur, the distance between the bearings may be reduced, or a larger number of stages may be put in in the same distance. On the other hand, it is essential to obtain a rigid construction which will withstand not only the stresses set up due to the centrifugal action, but also those which occur due to the substantial temperature changes which are continuously going on in the turbine due to changes in load and variations in the vacuum. If the turbine wheel or disk is rigidly fastened to the shaft, these latter stresses due to temperature changes are very large, particularly in the hubs, on account of the wheels or disks responding much more quickly to temperature changes than the heavy shaft, and with this arrangement a relatively heavy wheel having a strong hub is required as otherwise the wheel if made too thin and light will distort and possibly loosen on the shaft.

The primary object of the present invention is to provide an improved structure in which the wheel is flexibly or yieldingly connected to the shaft so it is free to respond to temperature changes independently of the shaft. By this arrangement the strains due to temperature changes are practically eliminated and as a consequence the wheels or disks may be made much lighter and thinner than heretofore.

A further object of my invention is to provide in connection with the flexible wheel mounting an improved arrangement of diaphragm packing wherein certain of the elements utilized in the flexible connection are also used in connection with the packing.

For a consideration of what I believe to be novel and my invention, attention is directed to the accompanying specification and the claims appended thereto.

In the drawing, Figure 1 is a sectional view of a portion of a turbine embodying my invention, the section being taken on line 1—1 of Fig. 2; Fig. 2 is a cross-section taken on line 2—2, Fig. 1; and Figs. 3, 4, 5 and 6 are views showing modifications.

Referring to the drawing, 8 indicates the casing of an elastic fluid turbine and 9 the shaft. The casing is divided into a suitable number of stages by nozzle carrying diaphragms 10, the casing and diaphragms being split horizontally to facilitate assembling. Carried by shaft 9 and located between the diaphragms are wheels 11 on the peripheries of which are mounted buckets 12.

Now, according to my invention, I fasten each wheel 11 to shaft 9 by means of a cylindrical member 13 which is somewhat larger in diameter than the shaft and which is connected at one end to the wheel and at the other end to the shaft. The cylindrical member 13 may be connected to the shaft and to the wheel in various ways and in the drawing I have illustrated several arrangements which will now be described.

In Figs. 1 and 2, cylindrical member 13 is provided with a flange 14 which is fastened to the wheel by rivets 15 or other suitable means. The side of the wheel is provided with an annular recess into which flange 14 fits so the surfaces of the flange and wheel are flush, and the flange is made thicker than the cylindrical member and has an annular groove 16 into which an annular projection 17 at the bore of the wheel fits. Or, viewed from another aspect, flange 14 may be considered as having an internal edge which fits into a groove in the side of the wheel. This provides interlocking shoulders between the wheel and the cylindrical member for taking a part of the stresses due to centrifugal force, and these shoulders are forced into firm engagement with each other and held by calking wires or strips as indicated at 18. The end of member 13, which is fastened to the shaft is provided with an internal projection 19 which serves to thicken the member at such end and give it an internal diameter substantially equal to the shaft diameter. This also provides a shoulder for engagement with a collar 20 carried by the shaft. Collar 20 may be a spring ring fastened in a groove in the shaft, the ring being split to facilitate putting it into place.

In assembling, the cylindrical member 13 is first fastened at the one end to the wheel after which the other end is shrunk on to the shaft in firm engagement with collar 20. One or more pins 21 are then put into place to hold the member against movement on the shaft after which a ring 22 is shrunk over the end of member 13. This serves to firmly connect the cylindrical member 13 to the wheel and shaft. In this arrangement it will be noted that member 13 extends through the bore of the wheel, the flange 14 being located on the side of the wheel remote from the end of member 13 which is fastened to the shaft. This arrangement permits of a cylindrical member of the desired length being used within a minimum axial length of shaft and hence results in a short overall length for any given number of stages.

In the modifications shown in Figs. 3, 4 and 5, the cylindrical member 13 is fastened to the shaft in the same manner as is shown in Figs. 1 and 2, but the manner in which it is fastened to the wheel varies in each instance. In Fig. 3, member 13 is provided with a thickened flange 24 which fits into a recess in the side of the wheel and is fastened to the wheel by rivets 25. Also the upper edge of the groove is pressed or peened over as indicated at 26 which serves to fit the flange firmly into the groove and hold it there. This results in a slightly longer structure than that of Figs. 1 and 2 but is a simpler one to build.

In Fig. 4 cylindrical member 13 is provided with a narrow flange forming a shoulder 28 and the wheel is shrunk onto the cylindrical member and in engagement with the shoulder. The wheel may have an annular groove as shown into which shoulder 28 fits. After the wheel has been shrunk onto cylindrical member 13, the two are fastened together by a suitable number of taps as indicated at 29.

In Fig. 5, the end of cylindrical member 13 is located in an annular groove 30 in the side of the wheel and held by pins 31 or other suitable means. After the end of member 13 has been inserted into groove 30, wall 32 at the one side of the groove may be rolled or otherwise forced toward the end of member 13 to grip it tightly in the groove. This arrangement is very simple to make and results in a strong connection between the wheel and the end of member 13.

In Fig. 6 is shown an arrangement for fastening the cylindrical member to the wheel similar to Figs. 1 and 2. The cylindrical member 13 is provided with a flange 34 having an inturned edge 35 which is located in an annular groove 36 in the side of the wheel 11 and is held therein by a calking ring 37, such ring having knurled surfaces which engage similar surfaces at the radially outer side of groove 36 and on edge 35. This arrangement gives a strong connection between the cylindrical member and the wheel without the use of rivets, taps or the like. At the same time it has the advantage as to length of structure as pointed out in connection with Figs. 1 and 2. In other words, in Figs. 1 and 2 and in Fig. 6, the cylindrical member and the wheel may be viewed as being arranged in concentric relation to each other.

As is well understood there must be a suitable packing means between the diaphragm and the shaft to prevent leakage and in Figs. 1, 4 and 5 I have shown shrink rings 22 as being provided with projecting sleeves 38 on which are annular packing teeth 39 which pack against the inner surface of a cylinder 40. Cylinder 40 is connected to the diaphragm 10 by an expansion ring 41 one end of which is formed integral with cylinder 40 and the other end of which is fastened in a groove in the diaphragm. A pin 42 is provided to prevent circumferential movement of cylinder 40 and expansion ring 41. The use of an expansion ring to connect cylinder 40 to the diaphragm is of advantage in that it permits the cylinder to expand and contract relatively to the diaphragm. Cylinder 40 and expansion ring 41 are split horizontally the same as is the diaphragm to facilitate assembling.

In Fig. 3 the packing teeth 43 instead of being arranged on a sleeve formed integral with shrink ring 22, are formed directly on cylindrical member 13 and pack against a surface on a member 44 having a head 45 carried in a groove 46 in the diaphragm. 47 is a locking piece held by a screw 48, its function being to prevent member 44 from turning.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. The combination with a shaft and a wheel having a bore of greater diameter than the shaft, of a cylindrical member which passes through the bore of the wheel and has one end connected to the shaft and the other to the wheel on the side of the wheel remote from that end of the member which is connected to the shaft.

2. The combination with a shaft and a wheel having a bore of greater diameter than the shaft, of a cylindrical member which passes through the bore of the wheel, a flange at one end of the member which is connected to the wheel, and means connecting the other end of the member to the shaft on the side of the wheel remote from that end of the member which is connected to the shaft.

3. The combination with a shaft, and a wheel having a bore of greater diameter than the shaft, of a cylindrical member of greater diameter than the shaft, an internal projection at one end of the member which engages the shaft, a shrink ring for fastening such end to the shaft, and means for fastening the other end of said member to the wheel.

4. The combination with a shaft, and a wheel having a bore of greater diameter than the shaft, of a cylindrical member of greater diameter than the shaft, an internal projection at one end of the member which engages the shaft, a shrink ring for fastening such end to the shaft, a flange at the other end of said member, and means fastening the flange to the wheel.

5. The combination with a shaft and a wheel having a bore of greater diameter than the shaft, of a cylindrical member of greater diameter than the shaft, a flange at one end of said member, said flange having an inturned edge, a groove in the wheel into which said edge fits, a calking means for holding it therein, and means for fastening the other end of the member to the shaft.

6. In combination, a shaft, a wheel having a bore of greater diameter than the shaft, and a cylindrical member surrounding the shaft and having one end connected thereto, the other end extending through the bore of the wheel and being fastened thereto on the side remote from that end of the member which is connected to the shaft.

7. In combination, a shaft, a wheel having a bore of greater diameter than the shaft, a cylindrical member surrounding the shaft and having one end connected to the shaft and the other end connected to the wheel, a diaphragm adjacent the wheel and packing means carried by the diaphragm and cylindrical member.

8. In combination, a shaft, a wheel having a bore of greater diameter than the shaft, a cylindrical member surrounding the shaft and having one end connected to the shaft and the other end connected to the wheel, a diaphragm adjacent the wheel, a packing surface carried by the diaphragm, and packing teeth carried by said cylindrical member and packing against said surface.

9. In combination, a shaft, a wheel having a bore of greater diameter than the shaft, a cylindrical member surrounding the shaft, means including a shrink ring for connecting one end of said member to the shaft, means connecting the other end of said member to the wheel, a diaphragm adjacent the wheel, a packing surface carried by the diaphragm, and a sleeve carried by the shrink ring and having annular packing teeth thereon which pack against said surface.

In witness whereof, I have hereunto set my hand this 8th day of May, 1919.

OSCAR JUNGGREN.